United States Patent [19]

Brogardh et al.

[11] Patent Number: 4,560,868

[45] Date of Patent: Dec. 24, 1985

[54] FIBER OPTICAL LUMINESCENCE SENSOR FOR MEASURING MECHANICAL DISPLACEMENT

[75] Inventors: Torgny Brogårdh; Bertil Hök; Christer Ovren, all of Västerås, Sweden

[73] Assignee: ASEA Aktiebolag, Västerås, Sweden

[21] Appl. No.: 462,702

[22] Filed: Jan. 31, 1983

[30] Foreign Application Priority Data

Feb. 2, 1982 [SE] Sweden ................ 8200575

[51] Int. Cl.⁴ .................................... G02B 5/14
[52] U.S. Cl. ..................... 250/227; 250/231 R
[58] Field of Search ........... 250/226, 227, 231 R, 250/237 G, 458, 461; 73/800, 862.04; 374/126, 130, 131

[56] References Cited

U.S. PATENT DOCUMENTS

| | | | |
|---|---|---|---|
| 4,342,919 | 8/1982 | Brogardh | 250/227 |
| 4,356,396 | 10/1982 | Ruell et al. | 250/227 |
| 4,356,448 | 10/1982 | Brogardh et al. | 250/231 R |
| 4,376,890 | 3/1983 | Engstrom et al. | 374/130 |

Primary Examiner—David C. Nelms
Attorney, Agent, or Firm—Watson, Cole, Grindle & Watson

[57] ABSTRACT

A fiber optical measuring apparatus suitable for measuring physical quantities such as position, speed, acceleration, force, pressure, elongation, temperature, etc., comprises at least one optical fiber for conducting incident light between an electronic unit and a sensor, the sensor comprising at least one luminescent element. The measuring apparatus is characterized in that the physical quantity to be measured is arranged to influence the position of an optical spectral filter, for example of absorption or interference type, relative to the optical fiber in the sensor and/or relative to said luminescent element, and that said spectral filter is arranged to be situated, to a greater or lesser extent, between the end surface of the optical fiber and at least one of the luminescent elements.

14 Claims, 11 Drawing Figures

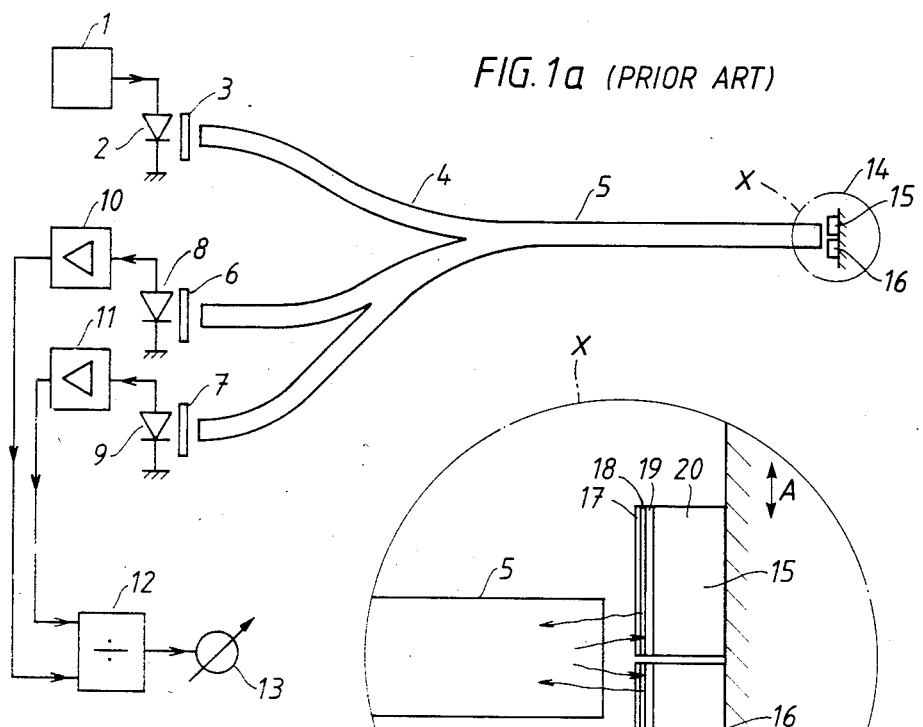
FIG. 1a (PRIOR ART)
FIG. 1b (PRIOR ART)
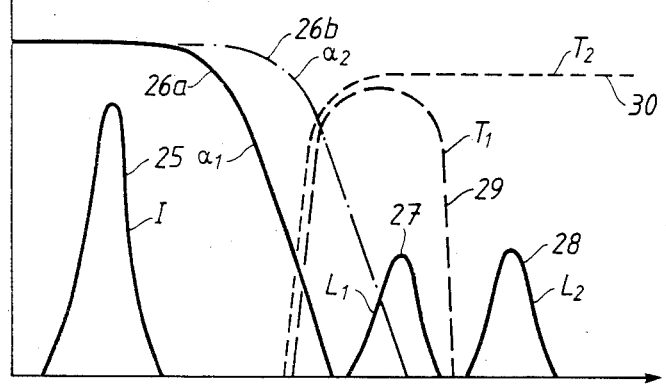
FIG. 2 (PRIOR ART)

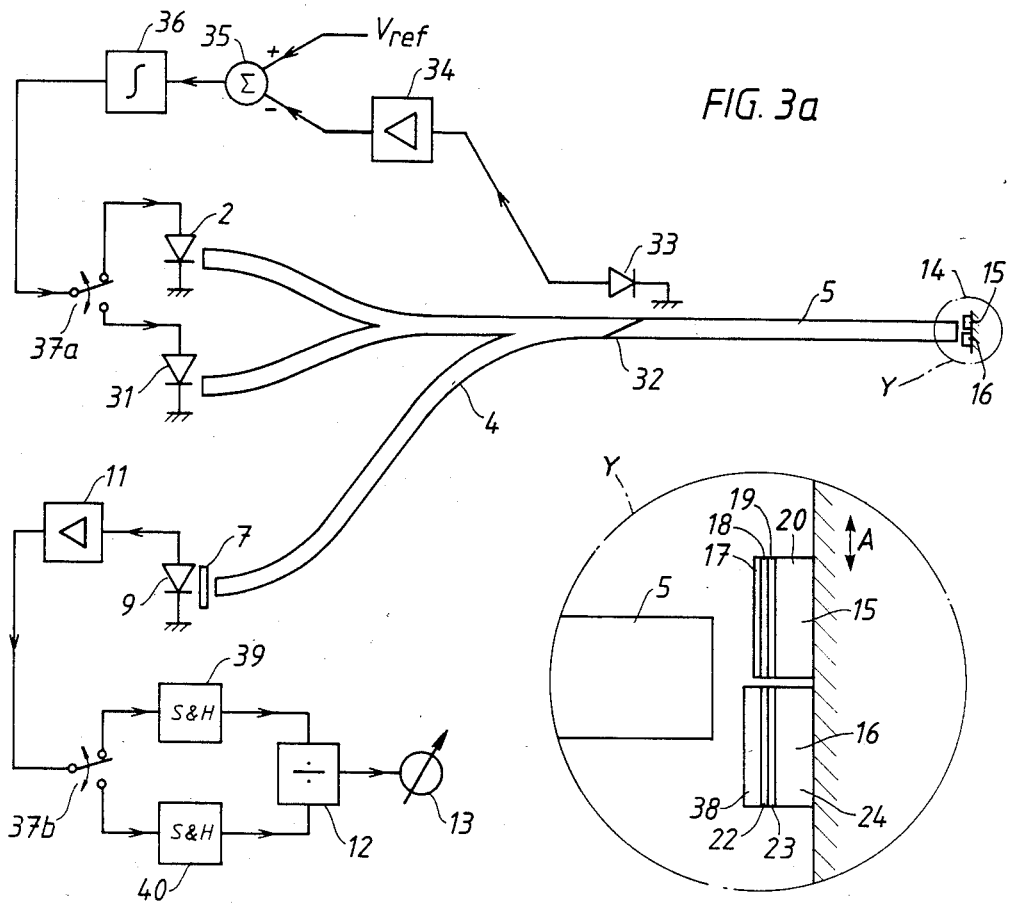
FIG. 3a
FIG. 3b
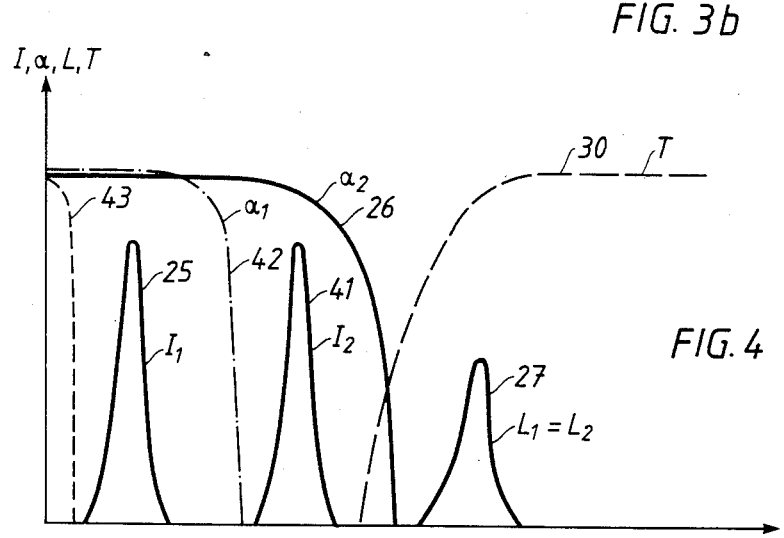
FIG. 4

FIBER OPTICAL LUMINESCENCE SENSOR FOR MEASURING MECHANICAL DISPLACEMENT

TECHNICAL FIELD

The present invention relates to a fiber optical measuring apparatus for measuring mechanical displacement of a member sensitive to a change in a physical quantity such as position, speed, acceleration, force, pressure, elongation or temperature, which apparatus comprises at least one optical fiber for conducting light between an electronic unit and a sensor, the sensor including at least one luminescent element.

Throughout this specification the references to "light" should be taken to include electromagnetic radiation in the infrared and ultra violet bands and not just in the visible part of the spectrum.

When measuring a change in a physical quantity by means of a luminescence sensor, problems arise in achieving high accuracy measurement over a substantial range of temperatures because of the wavelength displacement of the luminescence spectrum of the luminescent element when the temperature of the sensor changes.

DISCUSSION OF PRIOR ART

U.S. Patent Application Ser. No. 218,949, filed Dec. 22, 1980, now abandoned, discloses a luminescence-based fiber optical measuring apparatus for measuring changes in a mechanical quantity. In this prior proposal, any change in the mechanical quantity being measured causes a change in the position of a sensor that includes a luminescent material relative to the end of an optical fiber adjacent to the sensor. The advantage of this type of sensor, compared with a mechanical sensor which relies on the positional change of one or more reflecting members, is that since a wavelength change occurs in the sensor, optical reflections in the optical system of the apparatus can be eliminated by means of optical filters in the light emitters and/or in the light detectors of the apparatus. However, this known luminescence-based measuring device has proved to be of limited use when high demands for accuracy are made, and at the same time the sensor is subjected to wide temperature variations.

One object of the invention is to provide a solution to the above-mentioned problems and other problems associated therewith.

STATEMENT OF THE INVENTION

The invention relates to a fiber optical luminescence-based measuring apparatus for measuring a physical quantity which does not have the above-mentioned drawbacks, such drawbacks being very serious in many situations where accurate measurement is required. The invention is characterized in that the physical quantity to be measured is arranged to influence the position of an optical spectral filter, for example a filter of the absorption or interference type, relative to the optical fiber in the sensor and/or relative to the luminescent element, and that the spectral filter is arranged to be situated, to a greater or lesser extent, between the end surface of the optical fiber and at least one of the luminescent elements. The invention is further characterized in that, instead of measuring the relative light intensities from two adjacently positioned luminescent elements with differing luminescent spectra, selectively excited luminescence with identical luminescence spectra is measured, which thereby eliminates the temperature dependence.

BRIEF DESCRIPTION OF THE DRAWINGS

The invention will be further described, by way of example, with reference to the accompanying drawings, in which:

FIGS. 1a, 1b and 2 show a prior art measuring apparatus, FIG. 1b representing an enlarged view of the encircled portion X of FIG. 1a, FIG. 3a shows a complete measuring apparatus according to the invention, FIG. 3b represents an enlarged view of the encircled portion Y of FIG. 3a, showing the sensor of the apparatus, FIG. 4 shows the spectral relationships applying in the operation of the measuring apparatus of FIGS. 3a and 3b, and FIGS. 5, 6, 7, 8 and 9 show different embodiments of measuring sensor for the measuring apparatus of FIG. 3a.

DESCRIPTION OF PRIOR ART APPARATUS

Figure 5:
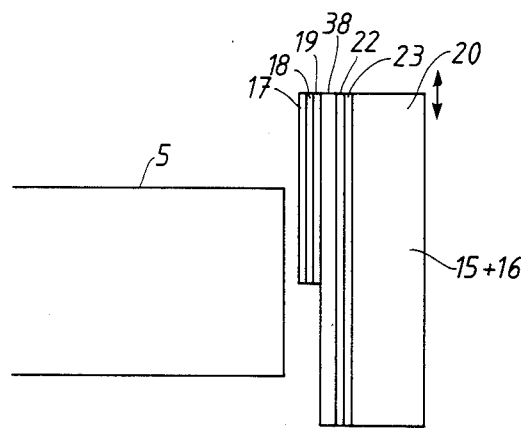

FIG. 1 shows a light-emitting diode (LED) 2 supplied with operating power by a drive circuit 1, part of the light emitted by the LED 2 being coupled into an optical fiber branch 4, after passing through a filter 3, to be further transported via an optical fiber 5 to a measuring sensor 14. In the sensor 14, there are two semiconductor elements 15 and 16 which are fixed relative to one another and can be moved together, relative to the distal end of the fiber 5, in the directions of the arrows A in FIG. 1b, in response to changes in the physical quantity to be measured. The semiconductor elements 15 and 16 are chosen to have different luminescent spectra, so that, when the monitored physical quantity changes, the displacement of the semiconductor elements 15, 16 will change the spectral composition of the luminescent light which is fed back into the fiber 5. This luminescent light is detected by means of two photodiodes 8 and 9, each of which is associated with a different optical filter 6 and 7, respectively, and the photocurrents of which are amplified by amplifiers 10 and 11. The quotient of these photo-currents is produced in a quotient generator 12, the output of which is fed to a measuring instrument 13. The reading shown on the instrument 13 is thus dependent on the position of the semiconductor elements 15, 16 to give the required measure of the physical quantity causing the movement of the semiconductor elements and this measure is not affected by variations in the light losses occurring in the fiber optical system or on changes in the light emission from the LED 2.

FIG. 1b shows one example of the construction of the semiconductor elements 15 and 16. The numerals 20 and 24 designate supporting substrates, on which epitaxial layers 17, 18, 19, and 21, 22, 23, respectively, have been grown. The luminescence is generated in the inner layers 18 and 22, respectively, and by giving these layers different spectral band gaps, for example, by employing different contents of Al in a GaAs system, and/or by doping with different substances (for example Ge and Si in a GaAs system), different luminescence spectra from the elements 15 and 16 are obtained. These types of structures for fiber optical sensors are well documented in the patent literature (see, e.g., U.S. Pat. application Ser. No. 306,349, filed Sept. 28, 1981, now abandoned and U.S. Pat. application Ser. No. 318,021, filed Nov. 4, 1981, now U.S. Pat. No. 4,473,747, the entire contents of which are herein incorporated by reference).

One example of the spectral relationship of the elements 15, 16 suitable in apparatus according to FIG. 1a are shown in FIG. 2, where 25 designates the emission spectrum I of the LED 2; 26a and 26b the absorption spectra $\alpha_1$, $\alpha_2$ of the layers 18 and 22 of the elements 15 and 16, respectively; 27 the luminescence spectrum $L_1$ from the layer 18; 28 the luminescence spectrum $L_2$ from the layer 22; 29 the transmission spectrum $T_1$ of the filter 6 and 30 the transmission spectrum $T_2$ of the filter 7. In the case of wide temperature variations of the sensor 14, the luminescence spectra 27 and 28 will be displaced with respect to wavelength, which makes the function of the filter 6 critical as regards the accuracy of the measuring apparatus.

DESCRIPTION OF EMBODIMENTS ACCORDING TO THE INVENTION

FIGS. 3a and 3b show how the above-mentioned temperature instability problem can be solved by the eliminating the filter 6 together with the associated photo-diode 8, while at the same time introducing a second LED 31, a new photo-detector 33 and a sensor filter 38. The same reference numerals are used in FIGS. 3a and 3b, as were used in FIGS. 1a and 1b, for similar components. The mode of operation of the measuring apparatus shown in FIG. 3a is as follows:

By means of a switch 37a, the LEDs 2 and 31 are alternately connected to a stabilizing circuit, which comprises a regulator 36, a difference generator 35 and a reference signal $V_{ref}$. Part of the light from the LEDs 2 and 31 is coupled out of the fiber 5 by a partial ray divider 32 and is sensed by the photo-detector 33, coupled to an amplifier 34 which also forms part of the LED stabilizing circuit. Employing a stabilizing circuit in this way ensures that a constant light intensity is coupled into the fiber 5 irrespective of whether it is coming from the LED 2 or the LED 31.

The luminescent light emitted from the sensor 14 into the fiber 5 is detected by the detector 9, the function of the filter 7 being to block out light from the LEDs 2 and 31 reflected in the optical fiber system, that is, the filter 7 eliminates excitation light from the luminescent light, which latter light constitutes the required measuring signal. The photo-current generated by the detector 9 is amplified in the amplifier 11 and is coupled alternately by a switch 37b, operating synchronously with the switch 37a, into sample and hold circuits (S&H) 39 and 40, the quotient of the output signals of the S&H circuits being produced in the quotient generator 12 and fed as the measuring signal to the measuring instrument 13.

One example of a suitable sensor design for the measurement system of FIG. 3a is shown in FIG. 3b. The upper sensor element 15 is identical with the sensor element 15 in FIG. 1b, but, in the lower sensor element 16, the layer 21 in FIG. 1b has been replaced with a layer 38 with a different absorption spectrum than that existing for the layer 21. Under the influence of excitation light from the LED 2, electrons are excited in the layer 18 only and therefore only this layer becomes luminescent, whereas under the influence of excitation light from the LED 31, both layers 18 and 22 become luminescent.

That this is the case is clear from the spectral distribution curves shown in FIG. 4, in which 25 again designates the emission spectrum $I_1$ of the LED 2; 41 designates the emission spectrum $I_2$ of the LED 31; 26 designates the absorption spectrum $\alpha_2$ of each of the layers 18 and 22; 42 designates the absorption spectrum $\alpha_1$ of the layer 38; 43 designates the absorption spectrum of the layer 17; 27 designates the luminescence spectrum of each of the layers 18 and 22, and 30 designates the transmission spectrum T of the filter 7. The LED intensity stabilizing circuit ensures that $\int I_1(\lambda)d\lambda = \int I_2(\lambda)d\lambda$, and the curves 25, 41 and 42 are so selected that temperature-induced displacements of the curve 42, within the anticipated temperature range, will not cause the latter to intersect the curve 41.

As will be clear from the FIG. 4, temperature-induced displacements of the spectrum 27 will not affect the detector signal, and therefore an accurate measurement of the displacement of the elements 15 and 16 in the directions of the arrows A can be made in the face of wide temperature changes of the sensor 14. In addition, the luminescence layers 18 and 22 can be carefully matched, which further increases the accuracy of measurement and the reproducibility of such measurements.

The measuring apparatus shown in FIG. 3a, can be used with a variety of different sensor designs. FIG. 5 shows a sensor in which the elements 15 and 16 have been integrated onto a single substrate 20. If, for example, liquid epitaxy is used to produce the sensor, the layers 23, 22, 38, 19, 18 and 17 are deposited, in the correct sequence, on the substrate 24. Thereafter, the layers 17, 18 and 19 are etched away by the use of, for example, a selective etching process, over part only of the surface of the sensor. In an $Al_{1-x}Ga_xAs$ system, the layers are distinguished by having different values of x, whereby the desired optical properties are obtained while at the same time providing conditions for selective etching.

Figure 6:
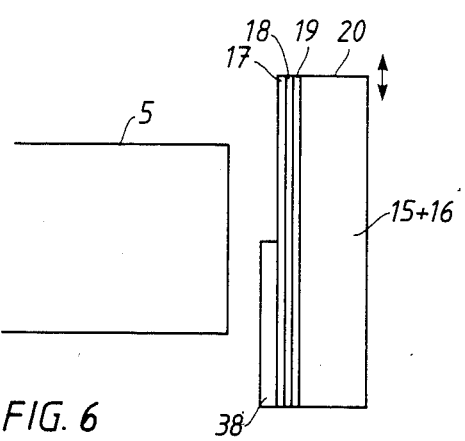
Figure 7:
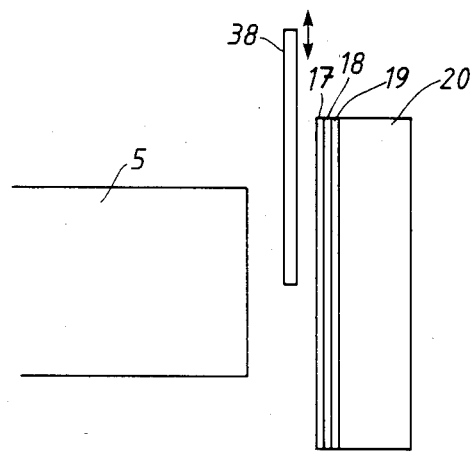

A somewhat simpler structure is shown in FIG. 6, the layers 17, 18 and 19 being common to both sensor elements 15 and 16. In this embodiment of sensor, the layer 38 is removed by etching from the upper sensor element, so that this upper element exhibits luminescence during excitation of both LED 2 and from LED 31, whereas the lower sensor element only emits luminescent light when the LED 31 is the excitation source. The layer 38 serves as a filter which is selective to incident light from only one of the sources 2 and 31 and, as shown in FIG. 7, can be detached from the luminescent element, the physical quantity to be measured then being arranged to move the filter 38 in the indicated directions between the end of the fiber 5 and the luminescent layer 18.

Figure 8:
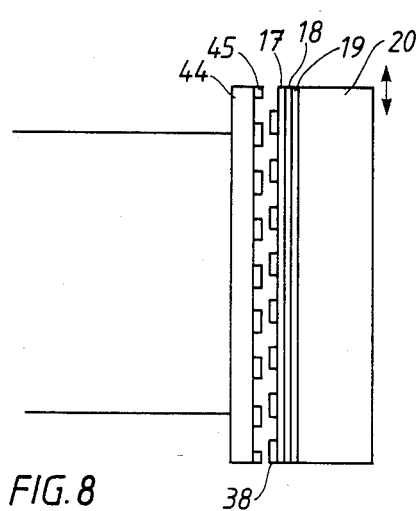

To increase the resolution of the sensor, the layer 18 can be partially etched out to form a screen pattern, as shown in FIG. 8 (e.g. by using lithography). At the same time a second screen pattern 45 is formed on a transparent substrate 44 which defines the end surface of the fiber. In addition to increased accuracy, better reproducibility can be obtained with this arrangement since the modulation is produced by the movement being sensed over the entire surface of the sensor. Local defects in the sensor will therefore be of less importance.

Figure 9:
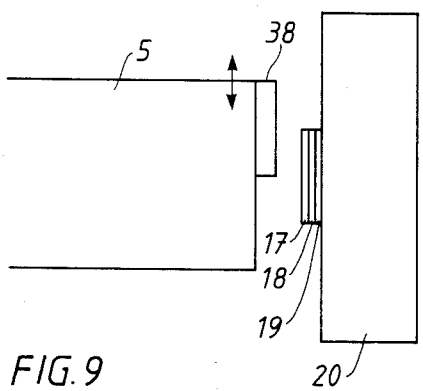

In those cases where the movement to be sensed influences the fiber 5, the filter 38 is attached to the fiber 5 and part of the luminescent layer 18 on the substrate 20 is removed by etching as shown in FIG. 9. This improves the possibilities of providing a linear response from the sensor.

The apparatus shown in FIG. 3a and the sensors shown in FIG. 3b and FIGS. 5 to 9 can be varied in many ways within the scope of the following claims.

What is claimed is:

1. In a fiber optical measuring apparatus for measuring a mechanical displacement comprising, optical fiber means having first, second and third ends, a first source of incident radiation adjacent to said first end of said optical fiber means for feeding incident radiation therein, a sensor adjacent to said second end of said optical fiber means, said sensor including at least one luminescent element which will emit luminescent radiation when receiving said incident radiation via said optical fiber means, radiation sensing means adjacent to said third end of said optical fiber means to receive luminescent radiation from said sensor via said optical fiber means and to generate an electrical output in response thereto, and means for varying the amount of luminescent light transmitted by the fiber in response to said mechanical displacement, the improvement wherein said measuring apparatus includes, a second source of incident radiation adjacent to said first end of said optical fiber means for feeding incident radiation therein, and a spectral filter interposed between said second end of said optical fiber means and said at least one luminescent element, said spectral filter having different light transmission spectra to radiation emanating from said first and second sources of incident radiation.

2. Measuring apparatus as claimed in claim 1, in which said mechanical displacement-responsive means is sensitive to a change in a physical quantity to be measured.

3. Measuring apparatus as claimed in claim 2, in which said physical quantity-sensing means influences the position of said spectral filter relative to said second end of said optical fiber means.

4. Measuring apparatus as claimed in claim 2, in which said physical quantity-sensing means influences the position of said spectral filter relative to said luminescent element.

5. Measuring apparatus as claimed in claim 1, in which said first and second sources of incident radiation are connected by optical feedback means to ensure the radiation reaching said sensor from said first and second sources are in a constant relationship of brightness magnitude to each other, the luminescent light emanating from the sensor to a photo-detector via the optical fiber means and said spectral filter, said spectral filter being arranged at least partly to block incident radiation from the sources and said output signal from the photo-detector to be demultiplexed to obtain two signals, corresponding to the luminescence in the sensor excited by the two incident sources.

6. Measuring apparatus as claimed in claim 5, except that the two sources of incident radiation are frequency-division multiplexed.

7. Measuring apparatus according to claim 5, together with means for forming the quotient of the demultiplexed detector signals in order to obtain a signal which is unambiguously dependent on the displacement being measured.

8. Measuring apparatus according to claim 6, together with means for forming the quotient of the demultiplexed detector signals in order to obtain a signal which is unambiguously dependent on the displacement being measured.

9. Measuring apparatus according to claim 1, in which said optical spectral filter consists of an absorption filter with an absorption edge positioned, with respect to wavelength, between the emission spectra of the two sources of incident radiation.

10. Measuring apparatus according to claim 1, in which said luminescent elements have a composition of materials which is substantially identical over the entire surface which is illuminated during a measurement.

11. Measuring apparatus as claimed in claim 1, in which said luminescent element consists of a luminescent semiconductor layer surrounded by further semiconductor layers which substantially conform to the lattice constant of said luminescent layer, and which have a larger band gap than said luminescent layer.

12. Measuring apparatus as claimed in claim 11, in which said semiconductor layers are made of semiconductor materials selected from the group consisting of $Ga_{1-x}Al_xAs$, $In_xGa_{1-x}As_yP_{1-y}$ and other ternary and quaternary III-V semiconductors, where x and y are made to vary from layer to layer in order to obtain the desired band gap relationships, the luminescent semiconductor layer being doped to obtain a certain luminescence spectrum.

13. Measuring apparatus according to claim 12, in which said optical spectral filter consists of a still further semiconductor layer and that this layer, by selective etching, has been removed from underlying semiconductor layers over part of the sensor surface.

14. Measuring apparatus according to claim 13, in which said partial surface is formed as a screen pattern which is able to move relative to another screen pattern.

* * * * *